MORPHOLOGY OF ABS

RUBBER SPHERES DISPERSED IN CONTINUOUS SAN RESIN PHASE

MORPHOLOGY OF POLYSULFONE

HOMOGENEOUS POLYSULFONE RESIN PHASE

MORPHOLOGY OF ABS-POLYSULFONE RESIN BLEND

CONTINUOUS ABS PHASE

CONTINUOUS POLYSULFONE RESIN PHASE

INVENTORS
ALFRED F. INGULLI
HENRY L. ALTER

James J. Long  AGENT

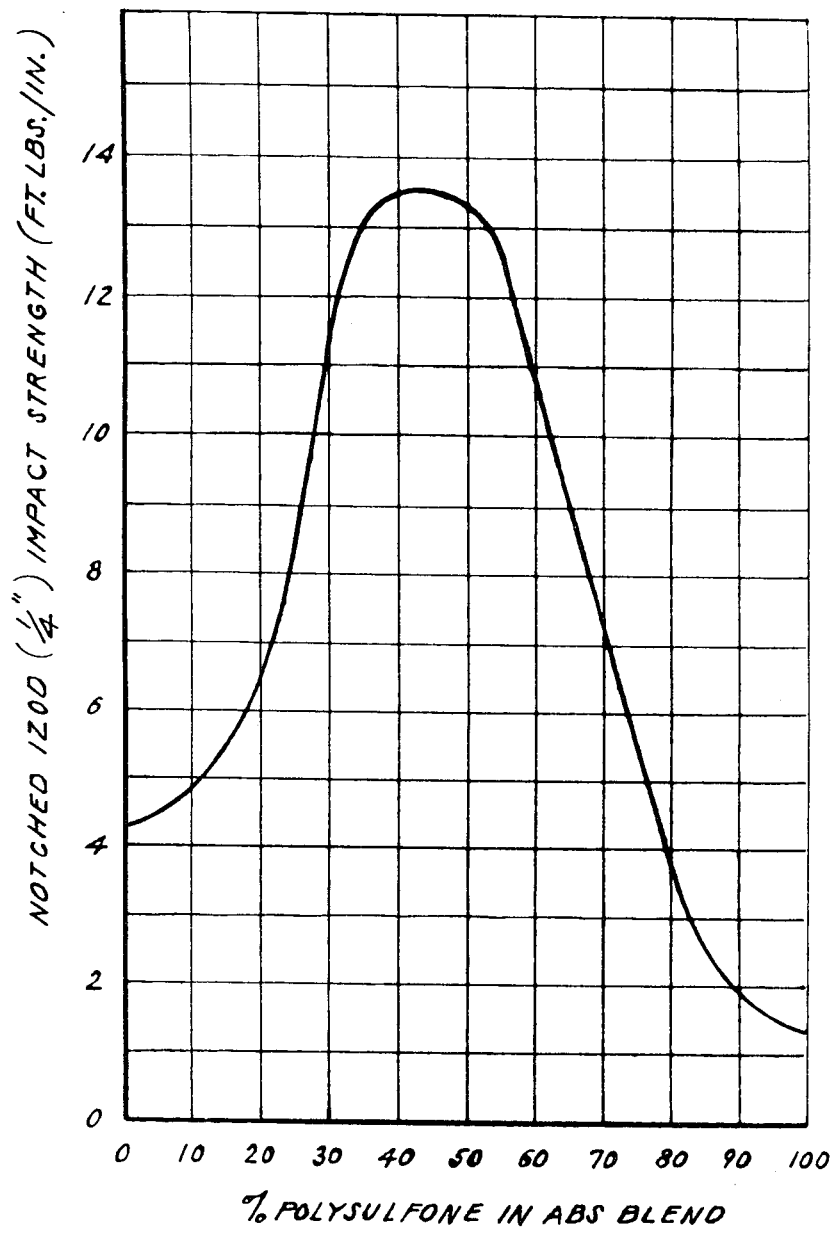

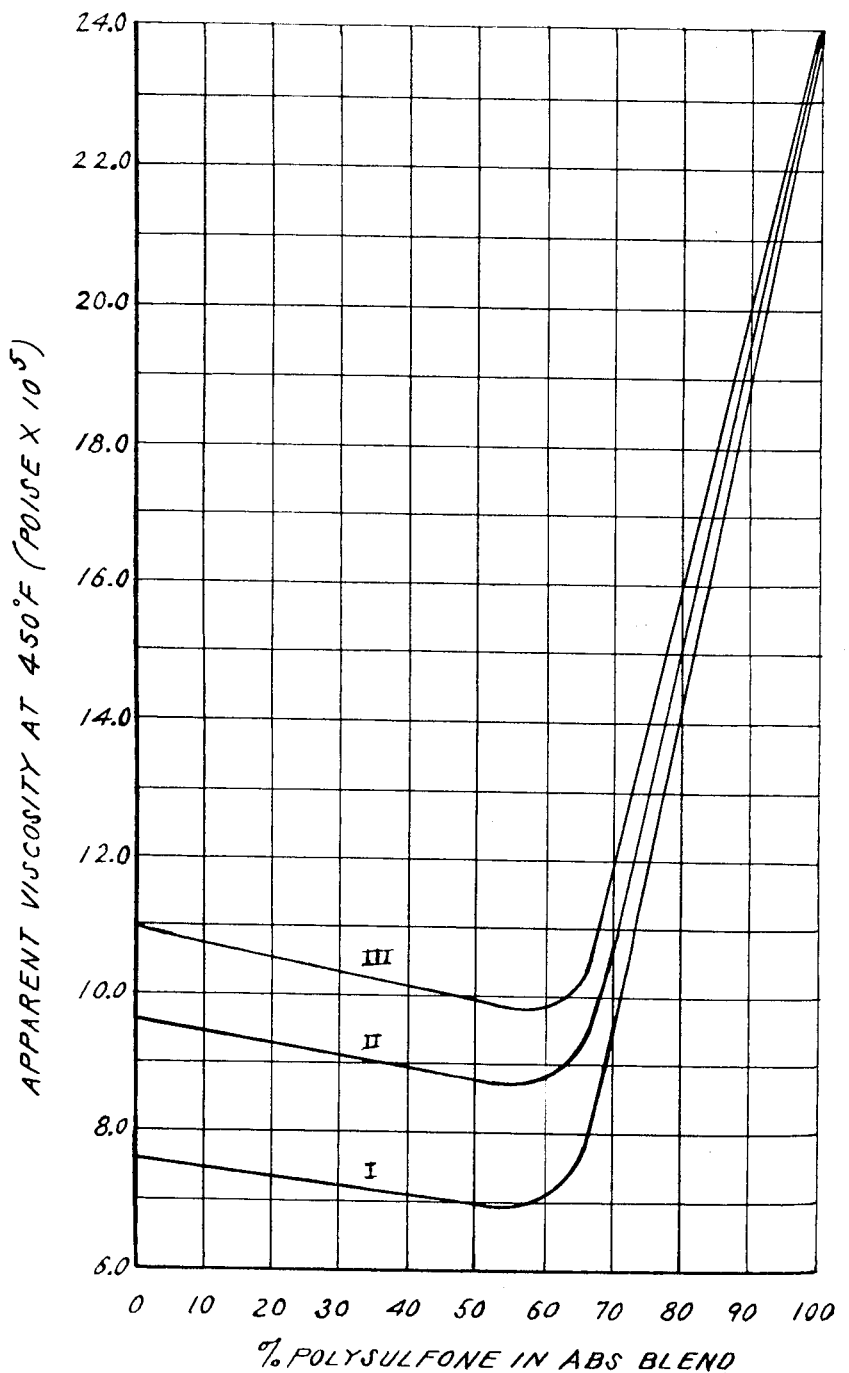

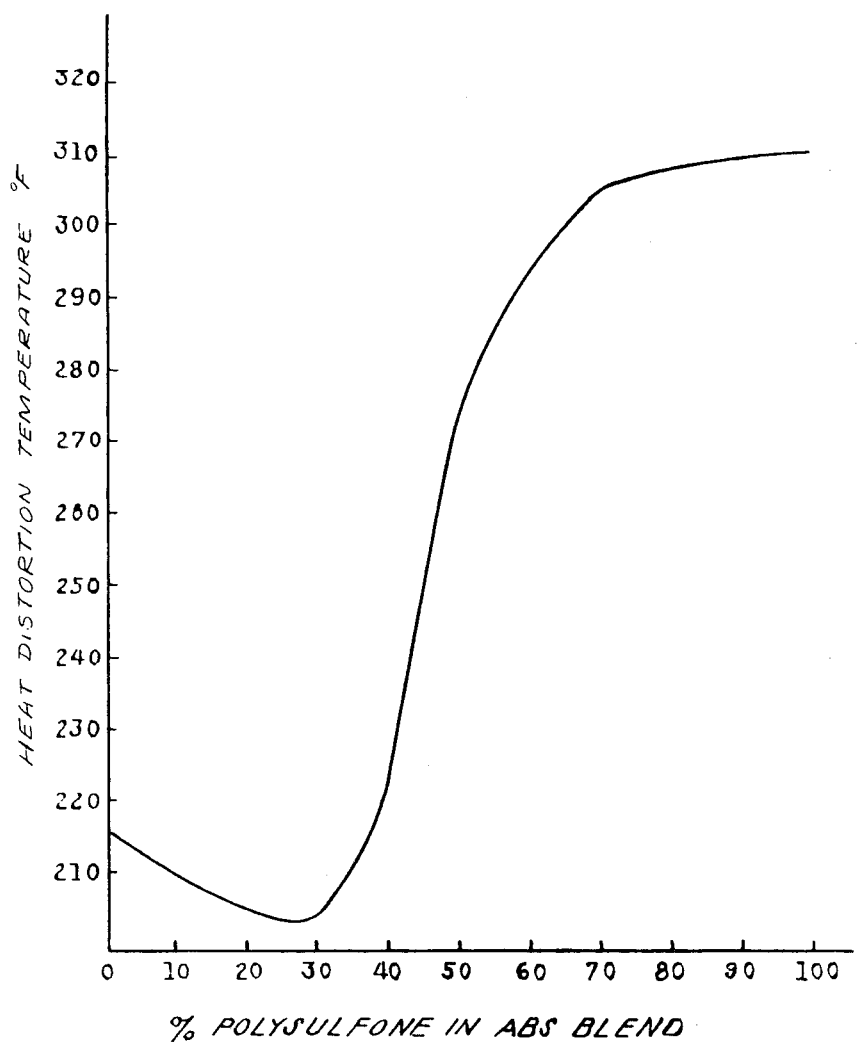

United States Patent Office 3,636,140
Patented Jan. 18, 1972

3,636,140
THERMOPLASTIC RESIN BLEND OF POLYSULFONE WITH ABS
Alfred F. Ingulli, Warren, Mich., and Henry L. Alter, West Haven, Conn., assignors to Uniroyal, Inc., New York, N.Y.
Continuation-in-part of application Ser. No. 827,766, May 26, 1969, which is a continuation-in-part of application Ser. No. 671,654, Sept. 29, 1967, which in turn is a continuation-in-part of application Ser. No. 866,068, Sept. 30, 1969, now Patent No. 3,555,119. This application Aug. 4, 1969, Ser. No. 847,070
The portion of the term of the patent subsequent to Jan. 12, 1988, has been disclaimed
Int. Cl. C08f 41/12
U.S. Cl. 260—876 R        9 Claims

ABSTRACT OF THE DISCLOSURE

Blends of thermoplastic polysulfone resin with ABS plastic are characterized by an unusually useful combination of properties, particularly high heat distortion temperature in combination with good flow and processing characteristics, as well as impact resistance, flexural strength and self-extinguishing characteristics.

CROSS REFERENCE TO RELATED APPLICATIONS

This application is a continuation-in-part of our copending application Ser. No. 827,766, filed May 26, 1969, and now abandoned, which is in turn a continuation-in-part of our copending application Ser. No. 671,654, filed Sept. 29, 1967 also now abandoned. Said abandoned application Ser. No. 671,654 was replaced by our streamlined continuation application Ser. No. 866,068, filed Sept. 30, 1969, now U.S. Pat. 3,555,119 issued Jan. 12, 1971.

BACKGROUND OF THE INVENTION

(1) Field of the invention

This invention relates to synthetic thermoplastic resin compositions. More particularly, the invention relates to the resin which results from the physical blending of a polysulfone thermoplastic resin with an ABS polymer.

(2) Description of the prior art

ABS resins of the kind employed in the invention are disclosed in U.S. Pats. 2,439,202, L. E. Daly, Apr. 6, 1948; 2,600,024 H. Romeyn, Jr. et al., June 10, 1952; 2,820,773, C. W. Childers, Jan. 21, 1958; 3,111,501, M. S. Thompson, Nov. 18, 1963; 3,198,853, R. L. Bergen, Jr., Aug. 3, 1965; and 3,261,887, J. U. Mann, July 19, 1966, for example.

Thermoplastic polysulfone resin of the kind employed in the invention is disclosed in U.S. Pat. 3,264,536, H. B. Robinson et al., Aug. 2, 1966, and British Pat. 1,060,546, Minnesota Mining and Manufacturing Co., published Mar. 8, 1967; also Cornell Ser. No. 847,427 filed herewith, now U.S. Pat. 3,554,972, issued Jan. 12, 1971.

Blends of ABS with various other polymers are known, but not with thermoplastic polysulfone resins. For example, blends of ABS with polycarbonate resins are disclosed in U.S. Pat. 3,130,177, T. S. Garbowski, Apr. 21, 1964.

Blends of thermosetting polysulfone resins with thermosetting phenolic resins (U.S. Pats. 3,245,947, N. D. Hanson et al., Apr. 12, 1966 and 3,256,361, J. Harding et al., June 14, 1966) are known, but such blends are quite unlike the blends of the present invention.

SUMMARY OF THE INVENTION

There is a need for reasonably priced plastic compounds with resistance to high temperatures which at the same time possess good flow characteristics and impact strength. The present invention provides such a compound in the form of a blend of from 10 to 90 parts (all quantities are expressed by weight herein) of a thermoplastic polysulfone plastic and correspondingly from 90 to 10 parts of ABS plastic. The resulting blends exhibit unexpected thermoplastic properties including improved flow, heat distortion temperature, impact resistance and flexural strength.

DESCRIPTION OF THE DRAWINGS

In the accompanying drawings:
FIGS. 4, 5, 6 and 7 are graphs showing variations in heat distortion temperature, impact strength, and apparent viscosity, with the percentage of polysulfone resin in blends of the invention.

DESCRIPTION OF PREFERRED EMBODIMENTS

Figure 1:
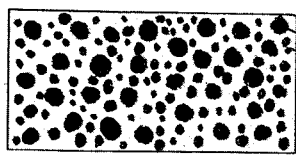
FIG. 1 is a purely diagrammatic representation, based on electron microscopy, of the morphology of a typical ABS plastic.

The expression "ABS plastic" is used herein in its conventional sense as referring to a thermoplastic polymer composition containing combined acrylonitrile, butadiene, and styrene. As is well known to those skilled in the art, the ABS plastic may be of the graft copolymer type, or of the physical blend type (polyblend), or a combination of the two. The conventional ABS graft copolymers are made by graft copolymerizing resin-forming monomers, namely, styrene and acrylonitrile, on a previously prepared polybutadiene rubber spine, or a butadiene-styrene copolymer rubber spine; in the final graft copolymer the resinous portion and the rubbery portion are in part chemically combined (typically 40–70% chemically combined). The graft copolymer may be made by an emulsion polymerization technique, in which a previously prepared latex of polybutadiene or similar rubber, which serves as a spine, is subject to emulsion polymerization conditions with a monomeric mixture of styrene and acrylonitrile emulsified therein. Alternatively, graft copolymer may be prepared by solution polymerization methods, or by so-called massbead technique. On the other hand, the physical blend type of ABS is typically a mixture of butadieneacrylonitrile rubber with separately prepared styrene-acrylonitrile resin. Frequently the graft polymer type of ABS includes additional separately prepared styrene-acrylonitrile resin blended with the graft copolymer. Any such type of ABS resin is suitable for blending with the thermoplastic polysulfone resin in accordance with the invention. Moreover, if desired, other styrene-type monomer (such as alphamethylstyrene) may be substituted for some or all of the styrene itself and other acrylic monomers (such as methacrylonitrile, ethyl acrylate, methyl methacrylate) may be substituted for some or all of the acrylonitrile-type monomer.

Since the ABS material has both a rubbery component (e.g., polybutadiene or butadiene-styrene spine or butadieneacrylonitrile copolymer component) and a resinous component (styrene-acrylonitrile), it may therefore be regarded as a "gum plastic" type of material. Usually the proportion of the rubbery component in the ABS is from 5 to 35%, while the proportion of resin is correspondingly from 95 to 65%. The overall proportion of acrylonitrile, butadiene and styrene-type monomer usually falls within the ranges: 10 to 40% acrylonitrile; 5 to 65% butadiene; and 25 to 85% styrene.

The polysulfone resin component of the blend of the invention may be described as a linear, thermoplastic polyarylene polyether polysulfone, wherein the arylene units are interspersed with ether and sulfone linkages. These resins may be obtained by reaction of an alkali metal double salt of a dihydric phenol and a dihalobenzenoid compound, either or both of which contain a sulfone linkage —SO₂— between arylene groupings, to provide sulfone units in the polymer chain in addition to arylene units and ether units. The polysulfone polymer has a basic structure composed of recurring units of the formula

—O—E—O—E'— wherein E is the residuum of the dihydric phenol and E' is the residuum of the benzenoid compound having an inert electron withdrawing group such as sulfone, carbonyl, vinyl sulfoxide, azo, and saturated fluorocarbon group in at least one of the positions ortho and para to the valence bonds; both of said residua are valently bonded to the ether oxygens through aromatic carbon atoms; at least one of said residua (E or E' or both) provides a sulfone linkage between aromatic carbon atoms. Such polysulfones are included within the class of polyarylene polyether resins described in U.S. Pat. 3,264,536, referred to above, the disclosure of which is hereby incorporated herein by reference for the purpose of describing and exemplifying E and E' in more detail, including the preferred forms of E derived from dinuclear phenols having the structure:

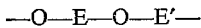

OH(Ar—R—Ar)OH as defined therein, with the further limitation that either E or E' must be so selected, from the values of E and E' disclosed in said patent, as to contain a sulfone linkage to provide sulfone units in the final polymer chain. Thus, if E is so selected as not to contain the sulfone linkage, then E' must be selected from one of the forms containing sulfone linkage; if E' is so selected as not to contain a sulfone linkage, then E must be selected from one of the forms containing a sulfone linkage. Of course, E and E' may both contain sulfone linkages if desired. Typical preferred polymers are composed of recurring units having the formula

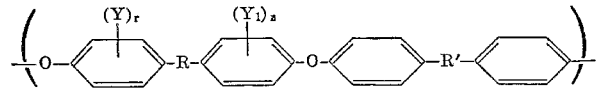

as described in the Robinson et al. patent, with the further proviso that at least one of R and R' must be —SO₂—. In the foregoing formula Y and Y₁ can be the same or different inert substituent groups as alkyl groups having from 1 to 4 carbon atoms, halogen atoms (e.g., fluorine, chlorine, bromine or iodine) or alkoxy radicals having from 1 to 4 carbon atoms, r and z are integers having a value of from 0 to 4, inclusive. Typically R is representative of a bond between aromatic carbon atoms or a divalent connecting radical and R' represents sulfone. Preferably R represents a bond between aromatic carbon atoms. Even more preferred are the thermoplastic polyarylene polysulfones of the above formula wherein r and z are zero, R is a divalent connecting radical of the formula

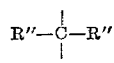

wherein R'' represents, as exemplified in Robinson et al., a member of the group consisting of alkyl, lower aryl, and the halogen substituted groups thereof, and R' is a sulfone group.

Typical examples are the reaction products prepared from 2,2-bis-(4-hydroxyphenyl) propane (source of E residue) with 4,4'-dichlorodiphenylsulfone (source of E' residue) and equivalent reaction products such as those from 4,4'-dichlorodiphenylsulfone with bisphenol of benzophenone (4,4'-dihydroxydiphenyl ketone), or the bisphenol of acetophenone [1,1-bis(4-hydroxyphenyl) ethane], or the bisphenol of vinyl cyclohexane [1-ethyl-1-(4-hydroxyphenyl)-3-(4-hydroxyphenylcyclohexane], or 4,4'-dihydroxydiphenyl sulfone (see Examples 1, 3, 4, 5 and 7 of Robinson et al.), or alpha, alpha'-bis(4-hydroxyphenyl)-p-diisopropylbenzene (see copending application Ser. No. 847,427 of R. J. Cornell filed of even date herewith, now U.S. Pat. 3,554,972, issued Jan. 12, 1971.

Further useful discussion of the polysulfone resins which may be used is to be found in British Pat. 1,060,-546, referred to above. Ordinarily at least about 10% and preferably at least about 20% of the linkages between the arylene groups are sulfone groups

Apart from the ether and sulfone linkages, arylene groups may be bonded directly to each other or may be separated by inert groups, e.g., alkylidene groups such as isopropylidene groups, which latter appear in the chain which bisphenol A [2,2-bis(4-hydroxyphenyl)] propane is used in the preparation of the polysulfone.

To prepare the blend of the invention, the two starting polymers, namely, ABS material and thermoplastic polysulfone resin, are mixed together in the desired proportions with the aid of any suitable mixing device conventionally used for mixing rubbers or plastics, such as a differential roll mill or an internal mixer. In order to facilitate thorough mixing of the polymers and to develop the desired improved combination of physical properties, the mixing is carried out at elevated temperatures, sufficient to soften the polymers so that they are thoroughly dispersed and intermingled with each other. The mixing temperature will in general vary with the particular ABS and the particular polysulfone employed; usually the polysulfone, which is the higher-softening material, will govern the mixing temperature selected. The mixing is continued until a uniform blend is obtained.

A preferred range for the amount of polysulfone resin in the blend is from 40 to 70 parts by weight, with correspondingly from 60 to 30 parts by weight of ABS material. Other preferred ranges include 40 to 80, 40 to 60 and also from about 60 to about 70 parts by weight of the polysulfone with corresponding amounts of ABS gum plastic. In general the blend preferably contains at least 48 parts by weight of the polysulfone resin. The most preferred range is about 48–60 parts.

The resin composition of the invention which results from the blending of thermoplastic polysulfone with ABS plastic possesses a synergistic effect in the area of flow, that is, the results of rheological studies on the materials of the invention surprisingly reveal the ability of blends of the invention to actually flow better (easier) than either the pure ABS or the pure polysulfone used in the blends. This is of immense practical importance. The main advantages of improved flow include lower processing temperatures, shorter cycles, ability to mold complicated parts, lower molded in stress, better part surface finish and simpler mold design. All of these advantages are related to flow, and depending on circumstances, any one of them could be the main advantage.

A particularly unexpected feature of the invention resides in the fact that the improved flow characteristics are obtained in combination with the remarkably high heat distortion temperature. In the range of 40%–60% polysulfone (blended with correspondingly 60% to 40% ABS), the behavior of the heat distortion temperature is particularly remarkable. Thus, the heat distortion temperature of the blend increases slowly as the percent polysulfone increases, until the 40% is reached. Above 40% polysulfone, the heat distortion temperature rises rapidly as the percent polysulfone increases. This is, surprisingly, an area of excellent flow properties in the mixture. At 40% of a particular commercially available polysulfone, the blend heat distortion temperature is 107° F. below that of pure polysulfone. At 60% polysulfone, the difference is only 21° F. In other words, a 20% increase in the concentration of this polysulfone based on the total blend weight caused the heat distortion temperature of the blend to increase 71.6% of the heat distortion temperature differential between the pure polysulfone and the pure ABS.

In addition to the unexpected combination of flow characteristics and heat distortion temperature, the present blends of polysulfone and the ABS possess other valuable properties. These properties include excellent impact strength and high flexural strength. The blends maintain most of the desirable characteristics of polysulfone and in addition embody a dramatic synergistic improvement in impact strength, primarily contributed by the ABS portion of the blend. The blends are less expensive than the pure polysulfone, and therefore represent an economical way of achieving a desirable combination of high impact strength, high heat distortion temperature, flow and processing characteristics. The blends are self-extinguishing when the polysulfone portion of the blend is presnt in 50% or greater concentration.

In addition to the essential polysulfone resin and ABS material, the blends of the invention may, if desired, contain other modifying ingredients, including pigments or fillers, glass reinforcement in the form of flake, powder or fiber, stabilizing agents, processing aids, lubricants, mold release agents, or other conventional modifying ingredients. The blends may be compounded with blowing agents, to make expanded materials.

The blends based on graft copolymer type of ABS are preferred, particularly from the standpoint of impact strength, although the blends based on polyblend (physical mixture) type of ABS have reasonable impact strength when compared with a plastic like PVC.

Figure 2:
FIG. 2 is a similar representation of the morphology of the polysulfone plastic.
Figure 3:
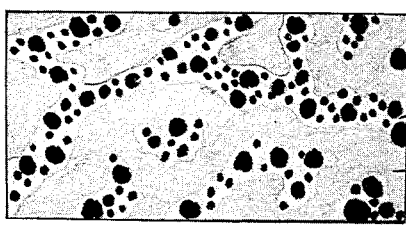
FIG. 3 is a similar representation of the blend of ABS with polysulfone.

While it is not desired to limit the invention to any particular theory of operation, it appears to be possible that certain unusual characteristics of the blends of the invention may be at least in part a consequence of an unusual morphology of the blends which appears to be largely unique in the engineering thermoplastic field. On the basis of electron microscopic examination of the blends, it has been concluded that basically the blends have a continuous polysulfone phase and a continuous ABS "composite phase." Referring to the drawing, FIG. 1 shows the morphology of a typical ABS, wherein the grafted rubbery spheres (dark spots) are dispersed in a continuous SAN resin phase. FIG. 2 shows the homogeneous nature of the polysulfone phase. FIG. 3 depicts the blend of the invention in cross-section, showing the continuous ABS "composite phase" (spotted areas) and continuous polysulfone resin phase (gray areas). The two continuous phases in the blend apparently account for the high heat distortion and good flow behavior. As the blend is heated the polysulfone phase must soften (since it is continuous) before the heat distortion temperature is reached. During flow, the ABS continuous "composite phase" probably acts as a lubricant, and the morphology definitely becomes anisotropic. This unusual morphology may also account for the synergistic impact strength. The presence of two continuous phases has apparently not heretofore been reported for other thermoplastic material blends.

The following examples will serve to illustrate the practice of the invention in more detail.

EXAMPLE I

In this example, the ABS employed contains 22.2% acrylonitrile, 26.5% butadiene and 51.3% styrene, and is made by blending 53 parts of graft copolymer with 47 parts of separately prepared styrene-acrylonitrile resin. The graft copolymer is a graft copolymer of 34 parts styrene and 16 parts acrylonitrile on 50 parts of polybutadiene. The styrene-acrylonitrile resin contains 71% styrene, 29% acrylonitrile.

The thermoplastic polysulfone employed is a commercially available polysulfone composed of recurring units having the structural formula

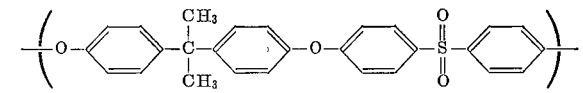

suitably prepared, for example, as described in Example I of the Robinson et al. patent referred to above.

Blends of the ABS and polysulfone, in various proportions as shown in Table 1 below, are prepared by mixing the two materials together in a Banbury mixer at 460° F. for two minutes. The blends are then sheeted off on a 375° F. mill and diced.

To determine the flow properties of the blends, the apparent viscosity is measured on a commercially available rheometer, such as the Instron Capillary rheometer, Model TTC, MCR. For this purpose, rods 5 inches by ⅜ inch are prepared by injection molding from the material to be tested. Each rod is heated to 450° F. in the barrel of the rheometer. A piston plunger is then pressed down on top of the heated rod, forcing the rod to flow through a 0.060 inch diameter capillary, having a length to diameter ratio of 33. The piston plunger descends at a constant speed of 0.01 inch per minute, and the force required to extrude the rod through the capillary is measured. The piston plunger speed employed is such as to prodce apparent shear rates which correspond roughly with those of a Mooney viscometer machine run at 2 r.p.m. and 450° F.

The results, as shown in Table I, show that the blends of ABS and polysulfone are capable of flowing better than either the pure ABS or the pure polysulfone used in the blends.

TABLE I.—PHYSICAL PROPERTIES OF POLYSULFONE-ABS BLENDS

| | | | | | | | | | | | |
|---|---|---|---|---|---|---|---|---|---|---|---|
| Percent polysulfone | 0 | 10 | 20 | 30 | 40 | 50 | 60 | 70 | 80 | 90 | 100 |
| Percent ABS, SAN graft type | 100 | 90 | 80 | 70 | 60 | 50 | 40 | 30 | 20 | 10 | 0 |
| ¼″ notched Izod, ft. lb./in. notch | 7 | 6.2 | 6.0 | 5.7 | 5.5 | 4.2 | 3.9 | 3.1 | 2.7 | 2.2 | 1.1 |
| Heat distortion temperature, ° F., 264 p.s.i. | 212 | 216 | 212 | 217 | 225 | 276 | 311 | 315 | 325 | 316 | 332 |
| Flexural strength, p.s.i. | 7,650 | 8,150 | 9,016 | 9,700 | 10,150 | 11,350 | 12,750 | 12,670 | 13,440 | | 15,200 |
| Apparent viscosity 450° F., poise, ×10⁵ | 7.6 | 7.3 | 7.4 | 7.2 | 7.6 | 6.7 | 6.9 | 8.2 | 17.0 | 15.2 | 25.6 |
| Self extinguishing | No | No | No | No | No | Yes | Yes | Yes | Yes | Yes | Yes |

TABLE II.—PHYSICAL PROPERTIES OF POLYSULFONE-ABS BLENDS

| | | | | | | | | | |
|---|---|---|---|---|---|---|---|---|---|
| Percent polysulfone | 0 | 10 | 30 | 40 | 50 | 60 | 70 | 90 | 100 |
| Percent ABS, SAN-nitrile rubber type | 100 | 90 | 70 | 60 | 50 | 40 | 30 | 10 | 0 |
| Heat distortion temp., ° F., 264 p.s.i. | 199 | 200 | 204 | 210 | 223 | 273 | 311 | 330 | 332 |
| Flexural strength, p.s.i. | 6,140 | 6,912 | 8,356 | 9,216 | 10,176 | 11,904 | 12,288 | 15,000 | 15,200 |
| Apparent viscosity 450° F., poise ×10⁵ | 9.75 | 9.30 | 8.84 | 8.85 | 8.89 | 8.85 | 10.5 | 16.1 | 25.6 |

Table I also shows that the blends of the invention have high impact strength, and good flexural strength.

The self-extinguishing property shown in Table I is measured by ASTM D635–63.

Figure 4:
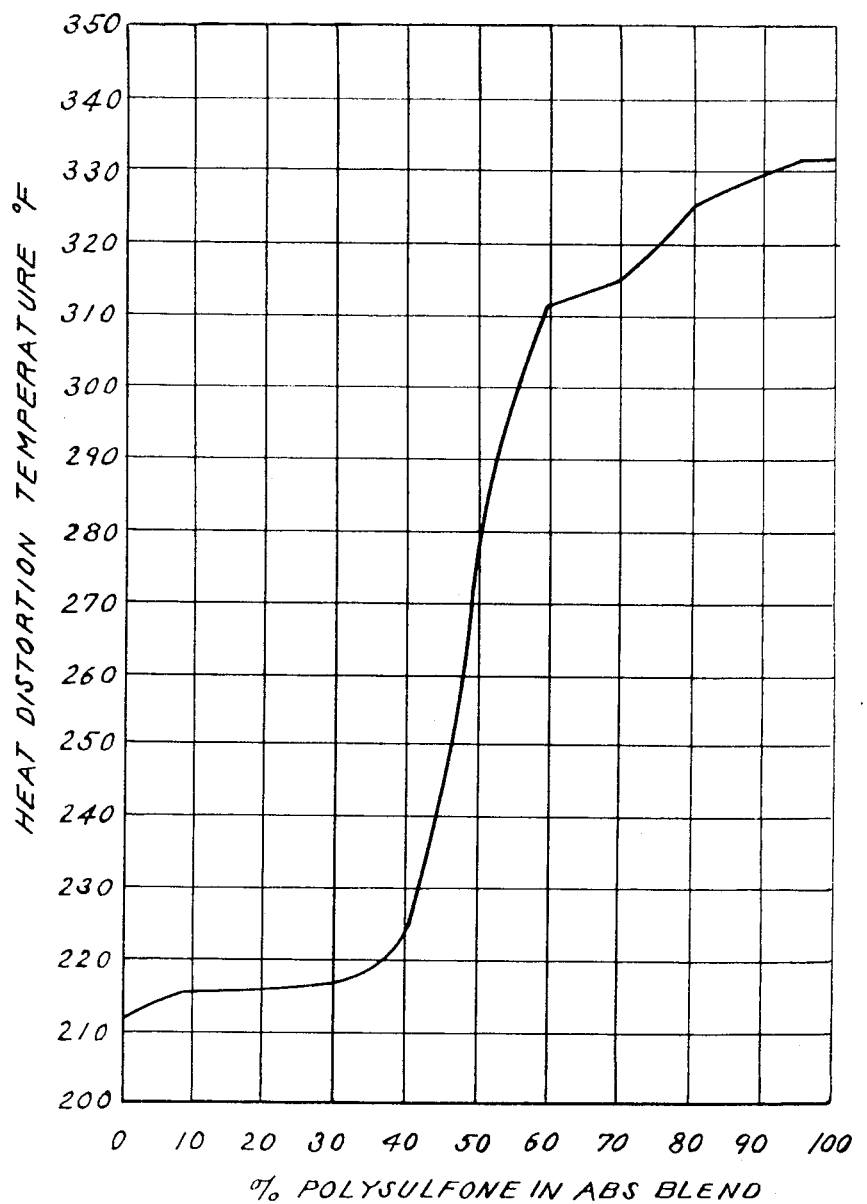

The graph in FIG. 4 of the accompanying drawings shows a plot of heat distortion temperature (measured by ASTM method D648–56[1961]) as a function of increasing polysulfone resin content of the blend. FIG. 6 shows the variation in apparent viscosity, for this example, and for Examples II and III, with polysulfone resin content.

EXAMPLE II

Table II lists the physical properties of an ABS-polysulfone blend prepared with a polyblend (physical mixture) type ABS. The ABS was made by blending 67% of styrene-acrylonitrile resin with 33% of butadiene-acrylonitrile rubber. The breakdown of monomers in the ABS is as follows:

| | Percent |
|---|---|
| Styrene | 49 |
| Butadiene | 19 |
| Acrylonitrile | 32 |

The polysulfone used in this example and the method of preparation of the blend was the same as in Example I. Flow properties were determined in the same way as in Example I.

By examining the data in Table II it can be seen that the apparent viscosity of the blends remains relatively constant at a level roughly equal to or below the pure ABS until the 90% polysulfone level is reached and well below that of pure polysulfone even at the 90% level (FIG. 6). It can also be seen that the heat distortion temperature of the blends increases with increasing polysulfone resin content, although not as dramatically as in Example I. Flexural strength also increases with increasing polysulfone.

EXAMPLE III

In this example, the ABS portion of the blend is a modified type of ABS, in which the styrene in the separately prepared styrene-acrylonitrile resin component of the ABS is replaced by alpha-methylstyrene, as described in U.S. Pats. 3,311,501 and 3,198,853, previously referred to. The ABS employed contains 22.58% acrylonitrile, 23.85% butadiene and 53.57% styrene-type monomers (20.67% styrene itself and 32.9% alpha-methylstyrene) and is made by blending 53 parts of graft copolymer with 47 parts of separately prepared alpha-methylstyrene-acrylonitrile resin. The graft is a copolymer of 34 parts styrene and 16 parts acrylonitrile on 50 parts of butadiene-styrene copolymer which contains 90% butadiene and 10% styrene. The resin copolymer contains 70% alpha-methylstyrene and 30% acrylonitrile. The thermoplastic polysulfone used is the same as in Example I. Blends of the ABS and polysulfone resin are prepared, in various proportions, by mechanically mixing the two materials together in a Banbury mixer at 460° F. for three minutes. These blends are then sheeted off on a 350° F. mill and diced.

Test specimens are prepared by injection molding the various blends using a standard screw machine. Physical properties of the blends are determined using ASTM test procedures. The physical properties for the various formulation may be found in Table III. The most striking result is the dramatic synergistic improvement in impact strength that is obtained when the ABS portion of the blend is seventy (70) to thirty (30) percent. This is shown in the graph in FIG. 5. Further, a sharp rise in the heat distortion temperature of the blends occurs when fifty (50) percent or more polysulfone is used. The same synergistic flow properties discussed in the previous examples also exist in the blends of this example (FIG. 6). Tensile and flexural strength of the blends increase linearly as the percent polysulfone resin is increased. The sixty (60) through thirty (30) percent ABS blends are the most attractive from both economic and property considerations.

TABLE III.—POLYSULFONE/ABS BLENDS

| | | | | | | | | | | | |
|---|---|---|---|---|---|---|---|---|---|---|---|
| Percent ABS | 100 | 90 | 80 | 70 | 60 | 50 | 40 | 30 | 20 | 10 | 0 |
| Percent polysulfone | 0 | 10 | 20 | 30 | 40 | 50 | 60 | 70 | 80 | 90 | 100 |
| Hardness, "R" | 98 | 100 | 104 | 108 | 112 | 114 | 118 | 120 | 123 | 126 | 120± |
| HDT, °F., 264 p.s.i | 216 | 205 | 219 | 230 | 238 | 285 | 300 | 304 | 313 | 313 | 332 |
| Notched Izod (ft. lbs./in.): | | | | | | | | | | | |
| ¼″ at RT | 5.3 | 3.3 | 4.2 | 10.5 | 13.4 | 13.4 | 11.2 | 8.2 | 3.3 | 2.1 | |
| ⅛″ at RT | 6.7 | 6.5 | 9.6 | 12.1 | 11.5 | 10.4 | 10.6 | 9.5 | 8.1 | 1.9 | 1.3 |
| ¼″ at −20° F | 2.4 | 1.3 | 1.2 | 1.8 | 2.2 | 2.9 | 3.5 | 2.3 | 1.1 | 1.1 | |
| ⅛″ at −20° F | 2.7 | 2.2 | 3.1 | 3.6 | 2.8 | 2.6 | 3.2 | 3.6 | 2.7 | 1.3 | 1.2 |
| Tensile strength, p.s.i | 5,391 | 5,740 | 6,200 | 6,704 | 7,221 | 7,657 | 8,206 | 8,756 | 9,470 | 10,360 | 10,200 |
| Flexural strength, p.s.i | 6,912 | 7,680 | 8,448 | 8,832 | 9,600 | 10,752 | 11,520 | 12,864 | 13,632 | 14,592 | 15,400 |
| Tensile, modulus, p.s.i., ×10⁵ | 2.6 | 2.6 | 2.8 | 2.9 | 2.9 | 3.1 | 3.2 | 3.2 | 3.4 | 3.7 | 3.6 |
| Flex. modulus, p.s.i., ×10⁵ | 2.5 | 2.5 | 2.5 | 2.5 | 2.9 | 2.9 | 3.3 | 3.3 | 3.3 | 3.3 | 3.9 |
| Apparent viscosity 450° F, poise ×10⁵ | 11.2 | | | | | 9.67 | | | | | |

EXAMPLE IV

In this example the ABS employed is the same as that described in Example III.

The thermoplastic polysulfone resin employed is composed of recurring units of the structural formula

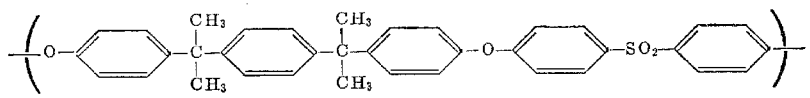

(See copending application Ser. No. 847,427 of R. J. Cornell filed of even date herewith), now U.S. Pat. No. 3,554,972, issued Jan. 12, 1971. It may be prepared as follows:

In a one liter stainless steel resin pot equipped with an oil heating bath, mechanical stirrer, gas inlet, Dean-Stark apparatus-condenser and an addition port is placed 26 g. (0.075 mole) of alpha, alpha′-bis(4-hydroxyphenyl)-p-diisopropylbenzene, 110 g. of sulfolane and 100 ml. of benzene, at room temperature. The reaction mass is sparged with nitrogen for 30 minutes before 20 g. (0.15 mole) of 42.3% aqueous potassium hydroxide solution is charged. Another 10 ml. of distilled water is used to complete the transfer of the potassium hydroxide solution.

The bath temperature is increased to 130° C. and azeotropic removal of water is started. Removal of water takes approximately ten hours; before complete removal of water is accomplished the bath temperature is increased to 180° C. The benzene is then distilled off and the resulting anhydrous solution of the dipotassium salt of alpha, alpha′-bis(4-hydroxyphenyl)-p-diisopropylbenzene in sulfolane is cooled to 70° C. 21.5 g. of 4,4′-dichlorodiphenyl sulfone (0.075 mole) dissolved in 50 ml. of benzene is then added to the anhydrous solution of the dipotassium salt. The temperature of the reaction mixture is increased to 200° C., distilling off the benzene as the temperature is increased. The polymerization is run for five hours at 200° C.

The resulting viscous polymer solution is cooled, and the polymer is precipitated in methanol. The polymer is placed in water and finely divided by high speed cutting blades in a blender. The finely divided polymer is washed thoroughly with water to remove all alkali metal salt. The polysulfone polymer is initially oven dried at 80° C.

cavity has a jacket through which heated oil may be circulated. The polymer blend to be examined is added to the cavity; the rotating blades exert a torque which may be measured and depends on the viscosity of the polymer. The data in Table V were obtained on 60 gram samples with an oil bath set at 220° C. In the table the "Melt Temperature" is the temperature of the polymer blend in the mixing cavity. This temperature is at times higher than the oil bath temperature because the mixing generates heat.

TABLE IV.—EXAMPLE IV POLYARYLSULFONE/ABS BLEND

| | | | | | | | |
|---|---|---|---|---|---|---|---|
| Percent ABS | 100 | 70 | 60 | 50 | 40 | 30 | 0 |
| Percent polyarylsulfone (Example IV) | 0 | 30 | 40 | 50 | 60 | 70 | 100 |
| Hardness (R) | 98 | | | 117 | | | 124 |
| HDT (264 p.s.i.) °F | 216 | 208 | 220 | 275 | 292 | 303 | 305 |
| Notched Izod (ft. lbs./in.): | | | | | | | |
| ¼″ at RT | 5.3 | | | 1.5 | | | |
| ⅛″ at RT | 6.7 | | | 3.7 | | | 0.85 |
| ¼″ at −20° F | 2.4 | | | 0.75 | | | |
| ⅛″ at −20° F | 2.7 | | | 1.1 | | | |
| Tensile Strength; p.s.i | 5,391 | | | 7,152 | | | |
| Flexural Strength; p.s.i | 6,912 | | | 10,368 | | | |
| Tensile Modulus p.s.i.×10⁵ | 2.6 | | | 3.0 | | | |
| Flexural Modulus p.s.i.×10⁵ | 2.5 | | | 2.9 | | | |
| 450° F. Mooney | 44 | | | 35 | | | 68 | for 14 hours followed by 12 hours in vacuo at 120° C. The glass transition temperature is 335° F., determined by differential scanning calorimetry. The reduced viscosity of a 0.45% chloroform solution at 30° C. is 0.46. The polymer isolated amounts to 98% of theory. Chemical analysis gives 5.8% hydrogen, 6.4% sulfur, and 75.5% carbon (theory 5.7% hydrogen, 5.7% sulfur, and 77.1% carbon). The polysulfone has a notched (⅛″) Izod impact strength of 0.85 foot-pound at 73° F., a Rockwell (R) hardness of 124, and a heat distortion temperature of 304° F. at 264 p.s.i.

Blends of the ABS and the foregoing polyarylsulfone resin, in various proportions as shown in Table IV, are prepared by mixing the two materials together at 430° F. in a Banbury mixer. The blend is sheeted off in a 350° F. mill and diced. The diced material is injection molded into test specimens using a standard screw machine. Physical properties, as determined by ASTM test procedures of the 50/50 blend, in comparison to the ABS itself, are shown in Table IV, along with heat distortion temperatures for the series. A plot of the heat distortion temperature (FIG. 7) shows the sharp rise in heat distortion temperature. The Mooney data in Table IV shows an unexpected non-linear increase in melt viscosity. The blend of this example, based on polyarylsulfone derived from alpha, alpha′-bis(4-hydroxyphenyl)-p-diisopropylbenzene and 4,4′-dichlorodiphenyl sulfone, is remarkable in that the highly significant drop in Mooney of the blend (as compared to 100% polyarylsulfone resin) is accompanied by only a relatively slight drop in heat distortion temperature. This lower Mooney is important in increased versatility in molding applications. The ⅛″ notched Izod of 3.7 foot-pounds is well within the range for useful applications in injection molded parts. Further evidence for improved flow with the blend based on the polyarylsulfone resin of this example, as compared to the blend of Example III (which used the polyarylsulfone resin described in Example I), is shown by the lower torque (melt viscosity) generated during Brabender mixing as shown in Table V. The values in Table V are determined in a mixer called a Brabender Plasticord, which has a small mixing cavity containing two rotating mixing blades; the speed of the mixing blades may be varied. The mixing

TABLE V.—BRABENDER MELT VISCOSITY VALUES

| R.p.m. | Melt temp. (C.°) | Torque (gram-meters) |
|---|---|---|
| 50/50 Blend as in Example III | | |
| 50 | 210 | 3,900 |
| 60 | 220 | 3,250 |
| 70 | 227 | 2,150 |
| 80 | 233 | 1,750 |
| 90 | 236 | 1,400 |
| 100 | 240 | 1,300 |
| 50/50 Blend as in Example IV | | |
| 50 | 210 | 2,400 |
| 60 | 215 | 1,900 |
| 70 | 222 | 1,500 |
| 80 | 225 | 1,300 |
| 90 | 230 | 950 |
| 100 | 233 | 700 |

From the foregoing it will be apparent that the present blends of polysulfones and ABS are suitable for use in many applications requiring a high temperature resistant, self-extinguishing, impact resistant plastic. Appliance housings, and automobile applications are numerous. The material is adaptable to conventional fabrication methods, especially injection molding, although other methods such as extrusion and blow molding may be used. The blends of the invention may be used in making truck cabs, camper bodies or trailers, and the like, if desired in the form of a laminate including an expanded layer of the material of the invention. In parts fabricated from the blend of the invention, the impact strength is less dependent on part thickness than in certain prior materials.

Having thus described our invention, what we claim and desire to protect by Letters Patent is:

1. A synthetic thermoplastic resin composition comprising a blend of
   (A) from 10 to 90 parts by weight of a linear thermoplastic polyarylene polyether polysulfone resin composed of recurring units of the formula:

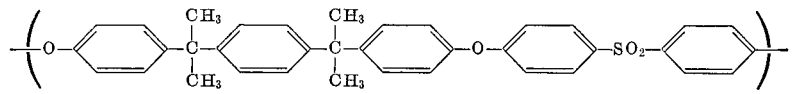

and
   (B) correspondingly from 90 to 100 parts by weight of acrylonitrile-butadiene-styrene polymeric material per 100 parts by weight of (A) plus (B).

2. A composition as in claim 1 in which (B) comprises a graft copolymer of styrene and acrylonitrile on a rubbery spine selected from polybutadiene and butadiene-styrene copolymer.

3. A composition as in claim 2 in which (B) contains separately prepared styrene-acrylonitrile resin.

4. A composition as in claim 2 in which (B) contains separately prepared alpha - methylstyrene - acrylonitrile resin.

5. A composition as in claim 1 in which (B) is a mixture of butadiene-acrylonitrile copolymer rubber and styrene-acrylonitrile resin.

6. A composition as in claim 1 in which (A) amounts to at least 48 parts and (B) amounts to correspondingly 52 parts or less.

7. A composition as in claim 1 in which (A) amounts to 40–70 parts and (B) amounts to correspondingly 60–30 parts.

8. A composition as in claim 1 in which (A) amounts to 40–60 parts and (B) amounts to correspondingly 60–40 parts.

9. A composition as in claim 1 wherein (A) amounts to about 48–60 parts and (B) amounts to correspondingly about 52–40 parts.

References Cited
UNITED STATES PATENTS

| | | | |
|---|---|---|---|
| 3,510,415 | 5/1970 | Barth | 260—49 X |
| 3,405,199 | 10/1968 | Snedeker | 260—887 |
| 3,400,065 | 9/1968 | Barth | 204—159.2 |
| 3,355,272 | 11/1967 | D'Alessandro | 260—838 X |
| 3,264,536 | 8/1966 | Robinson et al. | 317—258 |
| 2,802,809 | 8/1957 | Hayes | 260—876 X |

FOREIGN PATENTS 1,060,546   3/1967   Great Britain.

MURRAY TILLMAN, Primary Examiner

H. ROBERTS, Assistant Examiner

U.S. Cl. X.R.

260—49, 887

FO-1050
(5/69)

UNITED STATES PATENT OFFICE
CERTIFICATE OF CORRECTION

Patent No. 3,636,140     Dated January 18, 1972

Inventor(s) ALFRED F. INGULLI et al

It is certified that error appears in the above-identified patent and that said Letters Patent are hereby corrected as shown below:

Col. 10, line 71, change "100" to -- 10 --

Signed and sealed this 5th day of September 1972.

(SEAL)
Attest:

EDWARD M. FLETCHER, JR.
Attesting Officer

ROBERT GOTTSCHALK
Commissioner of Patents